(12) United States Patent
Chen (10) Patent No.: US 8,947,384 B2
(45) Date of Patent: Feb. 3, 2015

(54) LIQUID CRYSTAL DISPLAY PANEL WITH EMBEDDED TOUCHSCREEN COMPONENTS AND DRIVING METHOD THEREOF

(75) Inventor: Dong Chen, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 75 days.

(21) Appl. No.: 13/477,773

(22) Filed: May 22, 2012

(65) Prior Publication Data

US 2012/0299901 A1 Nov. 29, 2012

(30) Foreign Application Priority Data

May 23, 2011 (CN) .......................... 2011 1 0134525

(51) Int. Cl.
| | |
|---|---|
| G06F 3/041 | (2006.01) |
| G09G 3/36 | (2006.01) |
| G02F 1/1333 | (2006.01) |
| G06F 3/044 | (2006.01) |
| G02F 1/1362 | (2006.01) |

(52) U.S. Cl.
CPC .......... *G02F 1/13338* (2013.01); *G06F 3/0412* (2013.01); *G06F 3/044* (2013.01); *G02F 1/136286* (2013.01); *G02F 2202/10* (2013.01)
USPC .......................................... 345/173; 345/88

(58) Field of Classification Search
CPC ..... G06F 3/041; G06F 3/0412; G06F 3/0416; G06F 3/0418; G06F 3/044; G06F 3/0488; G06F 3/0414; G06F 3/045–3/047; G09G 3/36–3/3696; G02F 1/13338; G02F 1/136; G02F 1/1362; G02F 1/136286

USPC ............ 178/18.05–18.08; 345/87, 88, 90–93, 345/173, 174, 211, 212
See application file for complete search history.

(56) References Cited

U.S. PATENT DOCUMENTS

| | | | | |
|---|---|---|---|---|
| 2005/0057528 A1* | 3/2005 | Kleen | ............................ | 345/173 |
| 2009/0027352 A1* | 1/2009 | Abele | ............................ | 345/173 |

(Continued)

FOREIGN PATENT DOCUMENTS

| | | |
|---|---|---|
| CN | 101673013 A | 3/2010 |
| CN | 101825787 A | 9/2010 |

(Continued)

OTHER PUBLICATIONS

Extended European Search Report dated Sep. 27, 2012; Appln. No. 12169048.1-2205.

(Continued)

*Primary Examiner* — Nathan Danielsen
(74) *Attorney, Agent, or Firm* — Ladas & Parry LLP (57) ABSTRACT

The present disclosure relates to an LCD panel and a driving method thereof for realizing the embedded touchscreen function of such a LCD panel. The LCD panel according to the present disclosure comprises: an array substrate, a color filter substrate and a layer of liquid crystal provided between the two substrates, with gate lines and data lines are formed on the array substrate to define pixel units. An embedded touchscreen component is provided on the inner side of the array substrate, comprising: a first conductive line and a second conductive line. The first conductive line and the second conductive line constitute a two-layer structure, with a semiconductor layer being provided between the first conductive line and the second conductive line within the overlapping area of the two lines.

17 Claims, 7 Drawing Sheets

(56) References Cited

U.S. PATENT DOCUMENTS

| | | |
|---|---|---|
| 2009/0096760 A1 | 4/2009 | Ma et al. |
| 2009/0237369 A1* | 9/2009 | Hur et al. ........................ 345/173 |
| 2010/0013785 A1* | 1/2010 | Murai et al. .................. 345/173 |
| 2010/0066650 A1 | 3/2010 | Lee et al. |
| 2010/0225608 A1 | 9/2010 | Zhou et al. |
| 2010/0315382 A1 | 12/2010 | Kurihara et al. |
| 2011/0012115 A1 | 1/2011 | Jeon et al. |
| 2011/0141046 A1* | 6/2011 | Sato et al. ...................... 345/173 |
| 2012/0069258 A1* | 3/2012 | Fujioka et al. .................. 349/42 |

FOREIGN PATENT DOCUMENTS

| | | |
|---|---|---|
| CN | 101939693 A | 1/2011 |
| CN | 202177761 U | 3/2012 |
| WO | 2008108042 A1 | 9/2008 |
| WO | 2009147741 A1 | 12/2009 |

OTHER PUBLICATIONS

First Chinese Office Action dated Jan. 13, 2014; Appln. No. 201110231599.6.

Second Chinese Office Action dated Mar. 26, 2014; Appln. No. 201110231599.6.

Korea Non-Final Rejection Office Action dated Jan. 24, 2014; Appln. No. 10-2012-0054784.

* cited by examiner

LIQUID CRYSTAL DISPLAY PANEL WITH
EMBEDDED TOUCHSCREEN COMPONENTS
AND DRIVING METHOD THEREOF

CROSS REFERENCE TO RELATED APPLICATIONS

This application claims the benefit of Chinese Patent Application No. 201110134525.0 filed May 23, 2011, the entire disclosure of which is incorporated herein by reference.

BACKGROUND

Embodiments of the present disclosure relates to a liquid crystal display (LCD) panel and a driving method thereof.

Recently, LCD panels have been widely used in electronic products including cell phones, computers and the like. In order to enable the touchscreen function of an LCD panel, typically a touch screen panel (TSP) is attached externally to the surface of the color filter substrate of the LCD panel, resulting in an increased thickness and adversely affecting the appearance. An embedded touchscreen LCD panel is thus disclosed to provide the touchscreen component within an LCD panel to overcome the above mentioned disadvantages.

SUMMARY

Embodiments of the disclosed technology provide a new liquid crystal display (LCD) panel having the touchscreen function and the driving method thereof.

An embodiment of the present disclosure discloses an LCD panel, which comprises: an array substrate; a color filter substrate; and a layer of liquid crystal provided between the two substrates. Gate lines and data lines are formed on the array substrate to define pixel units, an embedded touchscreen component is provided on the inner side of the color filter substrate, comprising: a first conductive line and a second conductive line, wherein the first conductive line and the second conductive line constitute a two-layer structure, and a semiconductor layer provided between the first conductive line and the second conductive line within an overlapping area of the two lines.

According to another embodiment of the present disclosure, there is provided a driving method of an LCD panel, which comprises: applying a first voltage to the first conductive line of the embedded touchscreen component, and applying a second voltage to the second conductive line of the embedded touchscreen component in the LCD panel, wherein the first voltage is not equal to the second voltage; the on-state current of the semiconductor layer between the first conductive line and the second conductive line is less than the threshold current of a data processing unit in the case of no touching; the on-state current of the semiconductor layer at a touched position become no less than the threshold current of the data processing unit due to the gate turn-on voltage in the case of touching, the first conductive line and the second conductive line transmit the current signal of the semiconductor layer to the data processing unit for localizing the touched position.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

To better explain the technical solutions of the embodiments of the present disclosure, the accompanied drawings referred by the descriptions of the embodiments are described as below. It is obvious that these drawings merely serve to describe the embodiments of the present disclosure, those skilled in the art will recognize variations of the drawings without creative works.

DETAILED DESCRIPTION

The technical solutions of the embodiments of the present disclosure are described below in details in conjunction with the accompanied drawings. It is obvious these drawings merely belong to a portion of the embodiments of the present disclosure. All other embodiments that may be obtained by those skilled in the art based on the embodiments of the present disclosure without creative works are within the protection scope of the present disclosure.

The LCD panel according to an embodiment of the present disclosure may be any type of LCD panels, such as LCD panels of AD-SDS (Advanced-Super Dimensional Switching) type, IPS (In Plane Switch) type, TN (Twist Nematic) type.

For example, the AD-SDS technology generates a multi-dimensional electrical field by combining the parallel field formed by the peripheral parts of the pixel electrodes and the longitudinal field formed between the pixel electrode layer and the common electrode layer, causing variously-oriented liquid crystal molecules within the liquid crystal cells between and above the pixel electrodes to be rotated, thereby increasing the working efficiency of the planar-orienting type liquid crystal displays as well as the light transmittance thereof. The AD-SDS technology is able to improve the picture quality of a thin film transistor LCD (TFT-LCD), with various advantages including high transmittance, wide view angle, high aperture ratio, low chromatism, short response time and no push mura etc. Typically, one of the pixel electrode and the common electrode both provided on the array substrate of the AD-SDS LCD panel is provided with slots, the relative vertical relationship between the pixel electrode and the common electrode may be exchanged in the up-and-down direction, and the pixel electrode is connected with the drain electrode of the thin-film transistor. The orientation and angular arrangement of the slots can be modified as desired; for example, the slots may be set as parallel to the data line, to achieve a high aperture ratio.

First Embodiment

Figure 1:
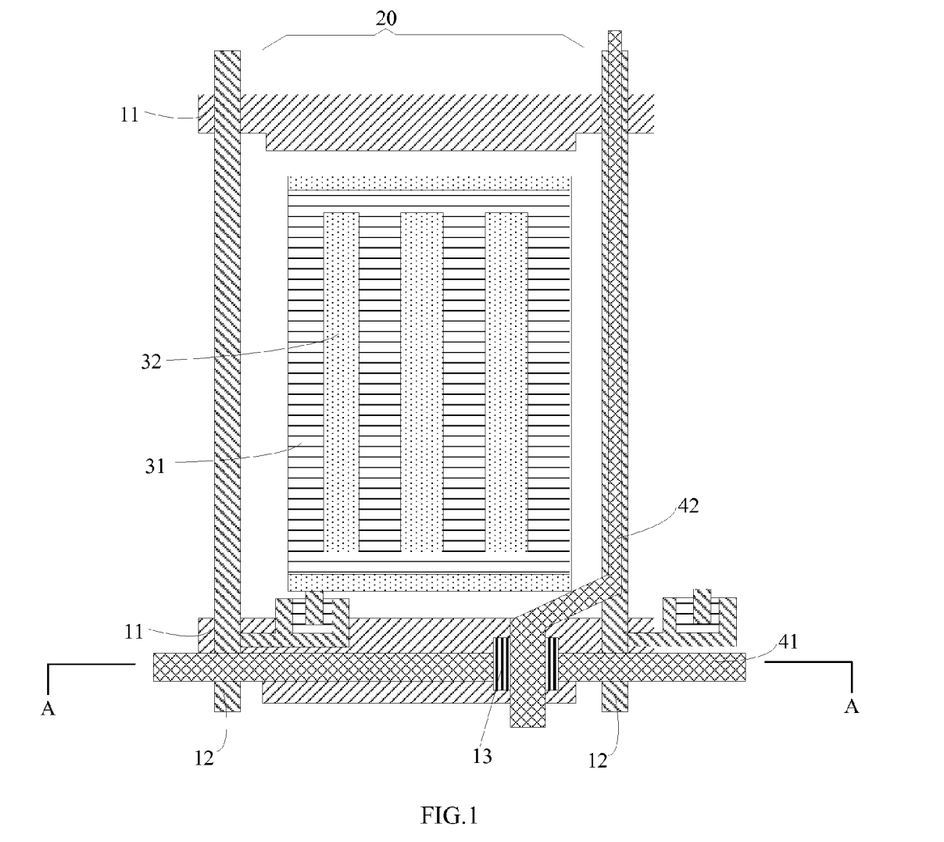
FIG. 1 is a top structural view of an LCD panel according to the first embodiment of the present disclosure.

As shown in FIG. 1, the present embodiment of the disclosure is described referring to an AD-SDS LCD panel.

The LCD according to the present embodiment of the disclosure comprises: an array substrate, a color filter substrate, and a liquid crystal layer provided between the two substrates. At least one gate line 11 and at least one data line 12 are formed on the array substrate, with the gate line 11 and the data line 12 defining a pixel unit 20; an embedded touchscreen component is provided on the inner side of the color filter substrate. The embedded touchscreen component comprises a first conductive line 41 and a second conductive line 42. The first conductive line 41 and the second conductive line 42 constitute a two-layer structure, with a semiconductor layer 43 provided between the first conductive line 41 and the second conductive line 42 within the overlapping area of the two lines 41 and 42.

As the touched area of the LCD panel by a finger or other subject (e.g., a pen) is usually larger than that of one pixel unit, the embedded touchscreen component according to the present embodiment of the disclosure may be distributed homogeneously in portion of the pixel units, instead of all pixel units; however, this should not be construed to limit the scope of the present disclosure. The configuration as shown in FIG. 1 is a configuration of a pixel unit provided with an embedded touchscreen component.

By way of example, the wiring configuration shown in FIG. 1 may be adopted, in order to avoid the influence of the wiring (the first conductive line and the second conductive line) of the embedded touchscreen component on the display effect of the pixel unit. The first conductive line 41 is formed on the color filter substrate and opposite to at least one gate line 11 on the array substrate; the second conductive line 42 is formed on the color filter substrate, opposite to at least one data line 12 on the array substrate.

The first conductive line 41 and the second conductive line 42 may be made of materials such as indium tin oxide (ITO), indium zinc oxide (IZO), aluminum zinc oxide (AZO), and the like.

The semiconductor layer 43 provided within the overlapping area of the two lines 41, 42 between the first conductive line 41 and the second conductive line 42 may be a semiconductor layer made of noncrystalline silicon or polycrystalline silicon, for example.

Furthermore, the turn-on (ON) voltage of the gate line may act as the driving voltage of the embedded touchscreen component in this embodiment. In this configuration, the overlapping area of the two lines 41, 42 on the color filter substrate may not be opposite to the overlapping area of the gate line 11 and the data line 12 on the array substrate, in order to avoid the influence of the data line on the driving of the embedded touchscreen component.

More specific, when there is no touching event, although there may be a voltage difference between the first and second conductive lines 41 and 42, but the current generated due to this voltage difference is small because the voltage difference is small and the embedded touchscreen component on the color filter substrate is relatively far from the corresponding gate line 11 on the array substrate, add the data processing unit will ignore this current. On the other hand, when there is a touching event, the embedded touchscreen component on the color filter substrate becomes nearer to the corresponding gate line on the array substrate and is affected by the voltage on the gate line, the semiconductor layer 43 between the first and second conductive lines 41 and 42 (as drain and source) become more conductive and the current between the lines 41 and 42 become larger than the threshold current of the data processing unit, and the data processing unit is triggered to work.

As shown in FIG. 1, in the embodiment, for example the width of the first line 41 is smaller than that of the semiconductor layer 43 in the direction perpendicular to the gate line 11, and therefore some portions of the semiconductor layer 43 is exposed from the first conductive line 1. When the touchscreen component on the color filter substrate is close to the array substrate, the voltage applied over the corresponding gate line 11 can act on the portions of the semiconductor layer 43 which are not covered by the first conductive line 41 to render them become conductive, and in this case, an on-state current is generated between the first conductive line 41 and second conductive line 42, and such on-state current is an the threshold current.

Figure 2:
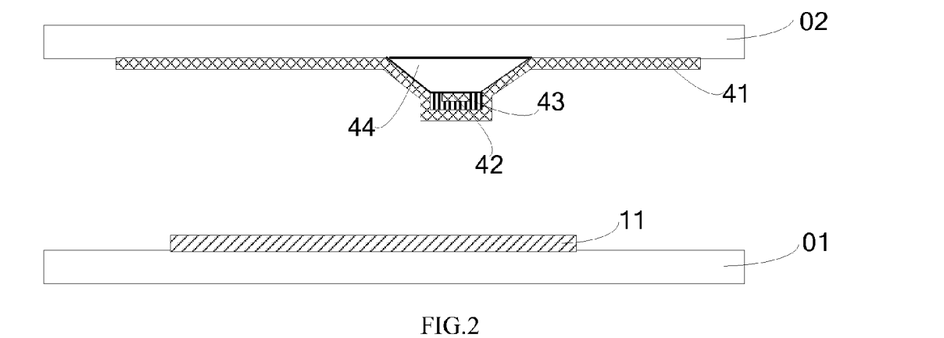
FIG. 2 is a cross-sectional structural view of the LCD panel of FIG. 1 and FIGS. 3-6 along line A-A.

Preferably, as shown in FIG. 2, a support 44 is provided within the overlapping area of the two lines 41, 42 between the embedded touchscreen component and the color filter substrate. Preferably, the support 44 is made of the same resin material as that for forming the spacers between the array substrate and the color filter substrate of the LCD panel. The sensitivity of the embedded touchscreen component may be improved by adopting such material due to the good resilience of the resin materials. It is also possible to choose other suitable materials in preparing the support 44; for example, the support 44 may be made of a transparent organic material, which can improve the light transmittance of the embedded touchscreen component. The purpose for providing the support 44 is to enable the embedded touchscreen component to be driven by the turn-on voltage of the gate line sensitively even with a relatively small touching force, thereby sensitively locating the touched position based on the signal variation on the first and the second conductive line.

The driving method of the LCD as shown in FIG. 1 may comprise the following steps.

1. A second voltage is applied to the second conductive line 42 of the embedded touchscreen component, and a first voltage is applied to the first conductive line 41 of the embedded touch screen component. The first voltage is not equal to the second voltage. The on-state current between the first conductive line 41 and the second conductive line 42 is less than the threshold current of the data processing unit in the case of no touching;

For example, the second voltage is larger than zero, and no more than the common voltage. The first voltage may be larger than the second voltage, or less than the second voltage. For example, the case that the first voltage is less than the second voltage may give rise to a better result. In practice, a proper voltage difference between the first conductive line and the second conductive line may be chosen as desired.

2. The on-state current of the semiconductor layer 43 at the touched position is no less than the threshold current of the data processing unit due to the gate line 11 turn-on voltage in the case of touching, and the first conductive line 41 and the second conductive line 42 transmit the current signal of the semiconductor layer 43 to the data processing unit, in order to localize or position the touched position.

The LCD panel and the driving method thereof according to the embodiment of the present disclosure may enable the embedded touchscreen to function by: providing an embedded touchscreen component in the LCD panel, wherein the embedded touchscreen component comprises a first conductive line and a second conductive line, and a semiconductor layer is provided between the first conductive line and the second conductive line within the overlapping area of the two lines; the on-state current of the semiconductor layer is less than the threshold current of the data processing unit in the case of no touching such that the data processing unit would not be actuated; however, in case that the on-state current is equal to or more than the threshold current of the data processing unit in the case of touching, the data processing unit would be actuated, such that the data processing unit can localize the touched position based on the current signals transmitted by the two lines, thereby according the LCD panel with the embedded touchscreen function.

Second Embodiment

The technical solution according to the present embodiment of the disclosure combines the embedded touchscreen function with a transflective LCD panel.

Figure 3:
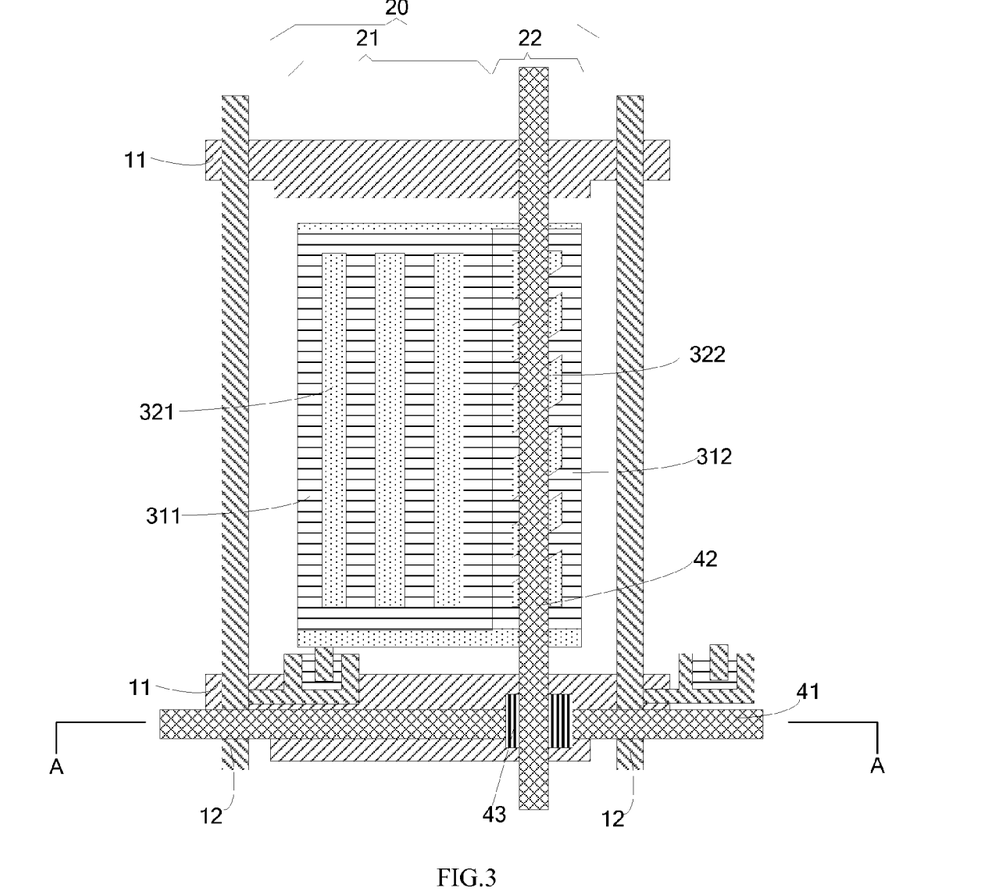
FIG. 3 is a first exemplary top structural view of an LCD panel according to the second embodiment of the present disclosure.

As show in FIG. 3, the LCD panel according to the present embodiment of the disclosure comprises: an array substrate, a color filter substrate, and a liquid crystal layer provided between the two substrates. Gate lines 11 and data lines 12 are formed on the array substrate, with the gate lines 11 and the data lines 12 defining pixel units 20; and embedded touchscreen component are provided on the inner side of the color filter substrate. Each of the embedded touchscreen components comprises a first conductive line 41 and a second conductive line 42. The first conductive line 41 and the second conductive line 42 constitute a two-layer structure, with a semiconductor layer 43 provided between the first conductive line 41 and the second conductive line 42 within the overlapping area of the two lines 41, 42.

The embedded touchscreen component can be used to localize or position the touched position based on the signal variations on the first conductive line 41 and the second conductive line 42.

Furthermore, each pixel unit 20 comprises a transmissive display area 21 and a reflective display area 22.

Figure 4:
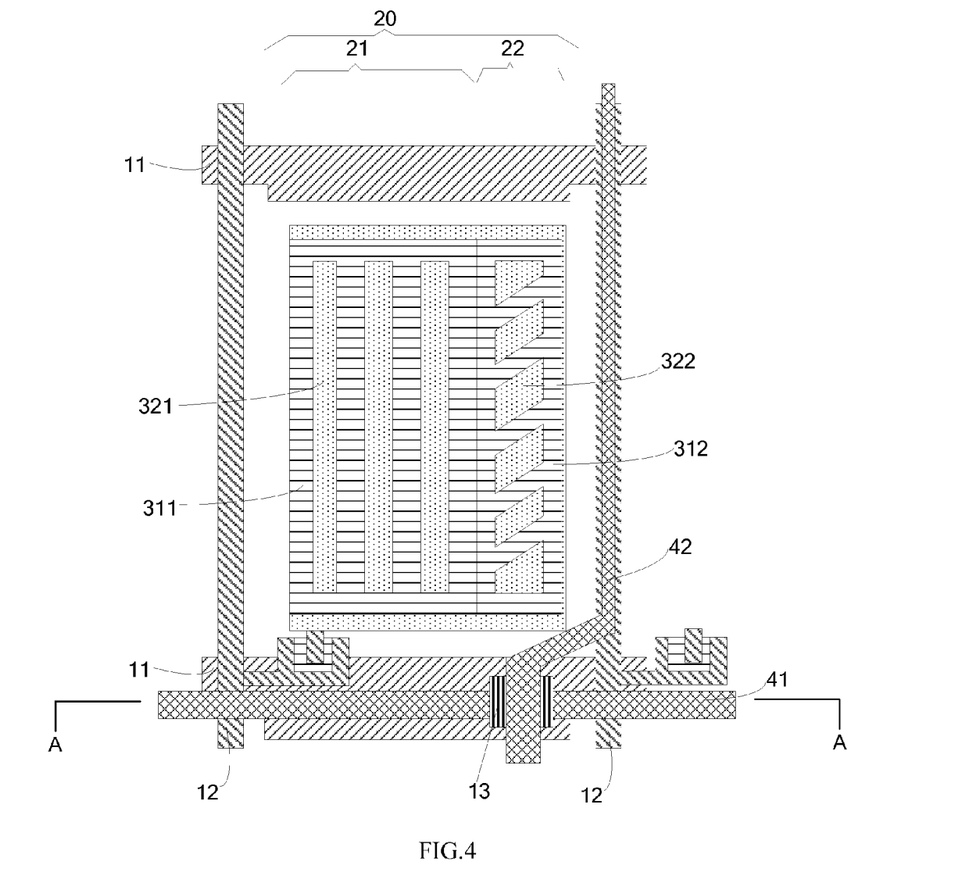
FIG. 4 is a second exemplary top structural view of an LCD panel according to the second embodiment of the present disclosure.

The first conductive line 41 is formed on the color filter substrate, opposite to at least one gate line 11 on the array substrate; the second conductive line 42 is formed on the color filter substrate and arranged opposite to the reflective display area 22 of at least one column of pixel units 20 on the array substrate. Or, as shown in FIG. 4, the second conductive line 42 is formed on the color filter substrate and opposite to at least one data line 12 on the array substrate.

As the touched area of the LCD panel by a finger or other subjects is usually larger than one pixel unit, the embedded touchscreen component according to the embodiment of the present disclosure may be distributed homogeneously in some of the pixel units; or it is also possible to distribute the embedded touchscreen components in all pixel units, which should not be construed to limit the scope of the present disclosure. The configuration as shown in FIG. 3 or 4 is a configuration of a pixel unit provided with an embedded touchscreen component.

The first conductive line 41 and the second conductive line 42 may be made of materials such as ITO, IZO, AZO and the like.

Figure 9:
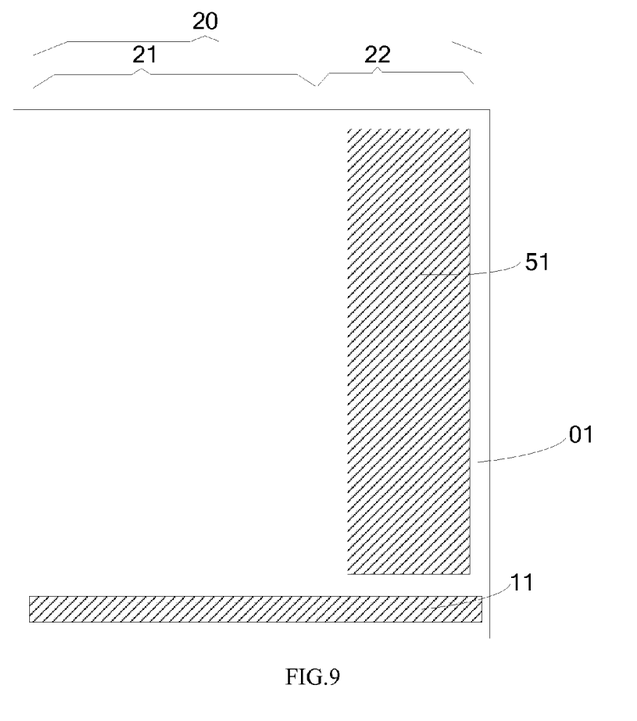
FIG. 9 is a schematic diagram of the process of forming a reflective layer on the substrate of the array substrate in the LCD panel of FIGS. 3-6.
Figure 10:
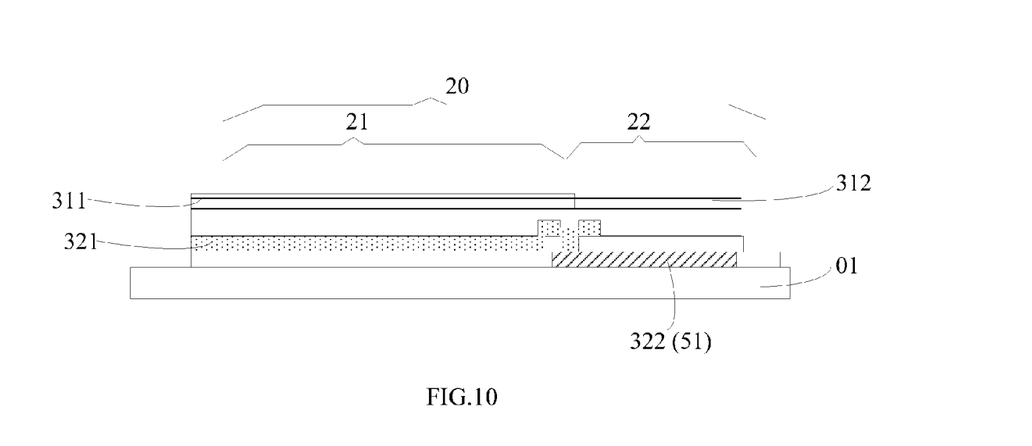
FIG. 10 is a structural view of pixel unit on the array substrate of the LCD panel of FIGS. 3-6.

In addition, as shown in FIGS. 9 and 10, the reflective display area 22 of the pixel unit 20 is provided with a reflective layer 51, which is formed in the same layer as the gate line 11. The related fabrication processing may comprise: forming a gate metal layer on the substrate 01 of the array substrate, then forming patterns of a gate line 11 and a reflective layer 51 of the reflective display area 22 of a pixel unit by using a lithography process. The subsequent steps may be performed with the fabrication processing currently available in the art.

In addition, as for a TN LCD panels, the reflective display area 22 of the pixel unit 20 is provided with a reflective layer 51, which is formed in the same layer as the gate line 11, or the reflective layer 51 may be formed in the same layer as the data line 12.

In the AD-SDS LCD panel as shown in FIG. 3 or 4, a common electrode 311 and a pixel electrode 321 is formed in the transmissive display area 21 of the array substrate, and a common electrode 312 and a pixel electrode 322 is formed in the reflective display area 22 of the array substrate. Referring to the AD-SDS LCD panel shown in FIG. 3 or 4, the common electrodes 311 and 312 are formed integrally, and the pixel electrodes 321 and 322 are formed integrally, for example. It should be noted that the electrodes connected with the drain electrodes of the thin-film transistors electrically are known as pixel electrodes.

Referring to the AD-SDS LCD panel in the present embodiment, the pixel electrode is formed on the array substrate prior to the common electrode, which makes the pixel electrode beneath the common electrode, wherein the pixel electrode is connected with the drain electrode of the thin-film transistor. The pixel electrodes of the reflective display area and the transmissive display area of a same pixel unit are usually of an integral solid configuration, while the common electrodes of the reflective display area and the transmissive display area of the pixel unit are usually of an integral hollow configuration, which enables various configurations of the common electrodes. As for the AD-SDS LCD panel, by way of example, the following configurations can be typically used to make the respective photoelectric curves of the reflective display area and the transmissive display area of the pixel unit identical.

For example, the common electrode 312 of the reflective display area and the common electrode 311 of the transmissive display area within the pixel unit 20 are of different shapes, making the respective photoelectric curves of the transmissive display area 21 and the reflective display area 22 in the pixel unit 20 identical. The display results of the two display areas 21, 22 of the pixel unit can be identical only in the case that the respective photoelectric curves of the two display areas 21, 22 of the same pixel unit are identical.

The photoelectric curve of the reflective display area 22 refers to the curve formed with the voltage of the common electrode 312 of the reflective display area 22 as an independent variable and the light intensity of the reflective display area as a dependent variable. The photoelectric curve of the transmissive display area 21 refers to the curve formed with the voltage of the common electrode 311 of the transmissive display area 21 as an independent variable and the light intensity of the transmissive display area as a dependent variable.

The two curves can be determined to be identical to each other based on the following preconditions. (1) The conditions of the reflective display area 22 and the transmissive display area 21 other than the configurations are identical for the LCD panel illustrated in FIG. 3 or 4. (2) For the LCD panel of FIG. 3, the second conductive line 42 may affect the photoelectric curve of the reflective display area 22, due to the fact that the second conductive line 42 is formed on the color filter substrate within the reflective display areas 22 of at least one column of pixel units, thus the voltage applied to the second conductive line 42 can be the common voltage (i.e., the voltages applied to common electrodes 311, 312) in order to minimize such effect. In other words, the photoelectric curve of the reflective display area 22 is mapped with the voltage of the second conductive line 42 being the common voltage. As for the LCD panel of FIG. 2, the second conductive line 42 is formed on the color filter substrate on a position opposite to at least one data line, the second conductive line 42 does not affect the photoelectric curve of the reflective display area 22, in such way, the second precondition is not required.

In addition, it should be noted that, the "identical" as used herein refers to the fact that the common electrodes 311, 312 are formed into different shapes to make the photoelectric curves of the transmissive display area 21 and the reflective display area 22 of the pixel unit 20 same. However, the "identical" as used herein may include case of being "substantially identical" due to the limits by the precision of the fabrication processing. It is obvious that the more the photoelectric curves of the two display area 21, 22 resembles each other, the better the respective shapes of the common electrodes 311, 312 of the two display areas 21, 22.

As an example of the shape of the common electrode of the reflective display area of the pixel unit being different from that of the common electrode of the transmissive display area, the common electrode 311 of the transmissive display area 21 is in the shape of a bar (a long rectangle or strip), whereas the common electrode 312 of the reflective display area is in the shape of another bar but not in parallel with that of the common electrode 311 of the transmissive display area. Preferably, the bar-shaped common electrode 311 of the transmissive display area forms an angle of 45 degree with the bar-shaped common electrode 312 of the reflective display area. For example, as shown in FIG. 3 or 4, the common electrode 311 of the transmissive display area 21 is in the shape of a rectangular bar in parallel with the data line 12, while the common electrode 312 of the reflective display area 22 is in the shape of a parallelogrammic bar not in parallel with the data line 12. Furthermore, the rectangular bar-shaped common electrode of the transmissive display area forms an angle of 45 degree with the parallelogrammic bar-shaped common electrode of the reflective display area, such that the optical paths of the reflective display area and the transmissive display area of the LCD panel are substantially identical; and if necessary, the angle may be further adjusted to make the respective photoelectric curves of the two display areas 21, 22 identical.

Figure 5:
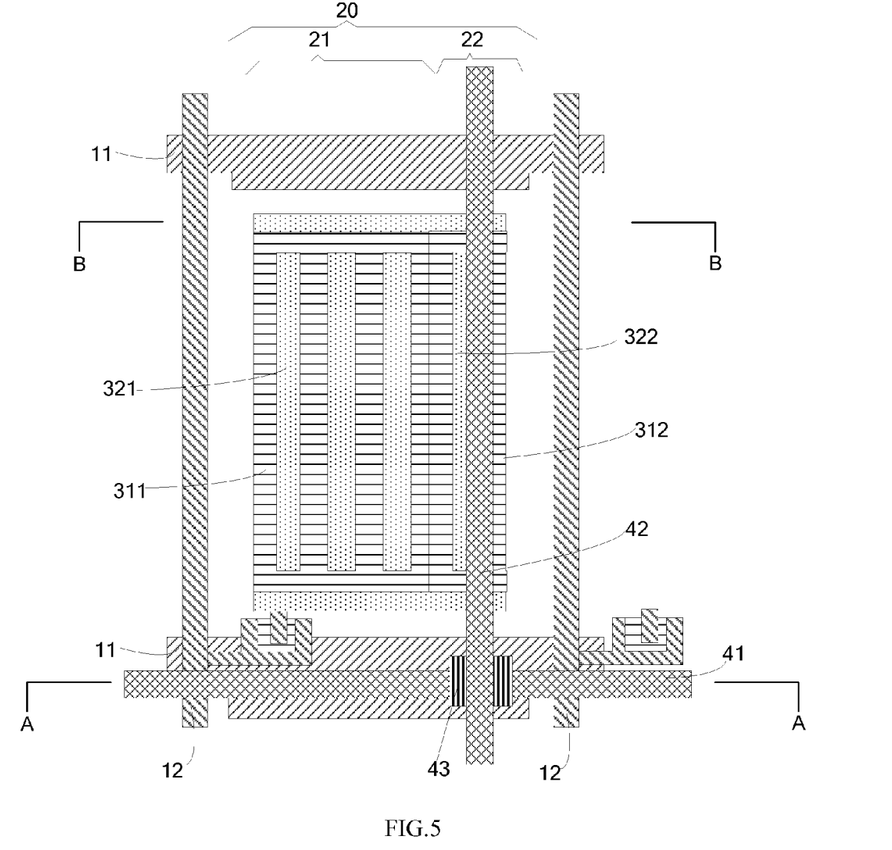
FIG. 5 is a third exemplary top structural view of an LCD panel according to the second embodiment of the present disclosure.
Figure 6:
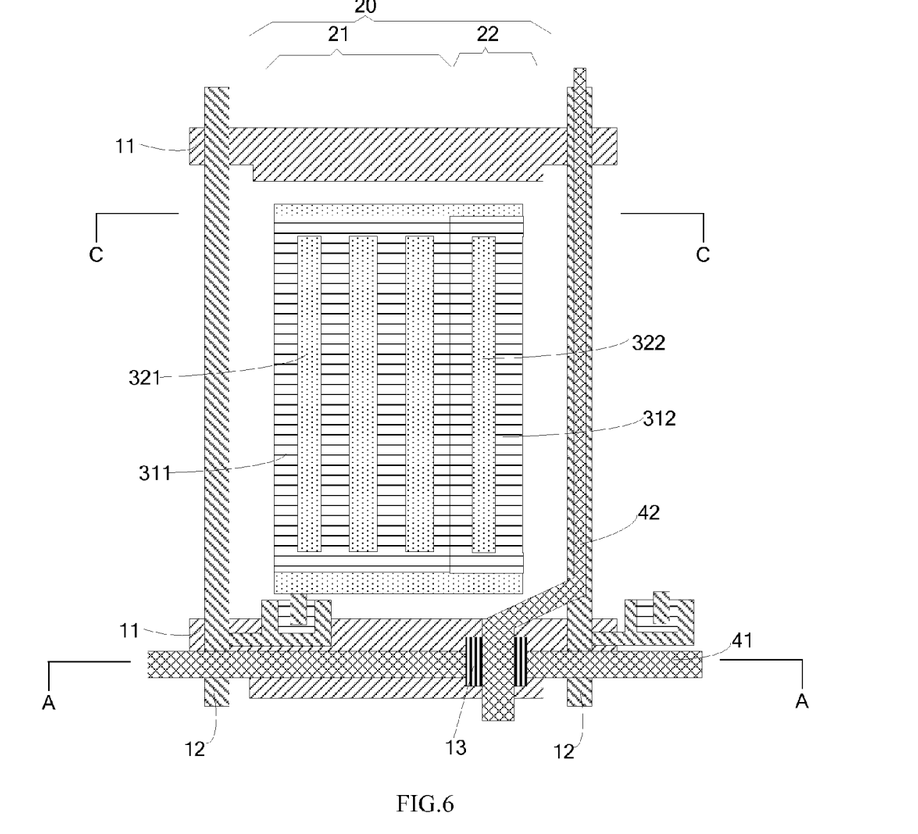
FIG. 6 is a fourth exemplary top structural view of an LCD panel according to the second embodiment of the present disclosure.
Figure 7:
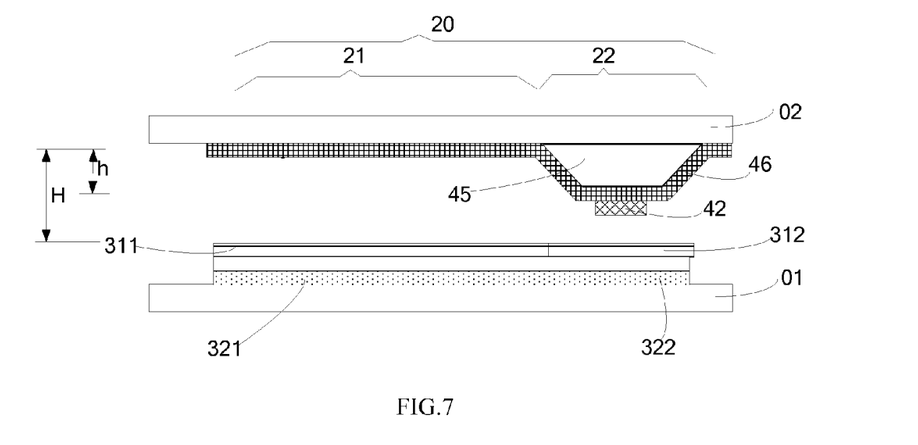
FIG. 7 is a cross-sectional structural view of the LCD panel of FIG. 5 along line B-B.
Figure 8:
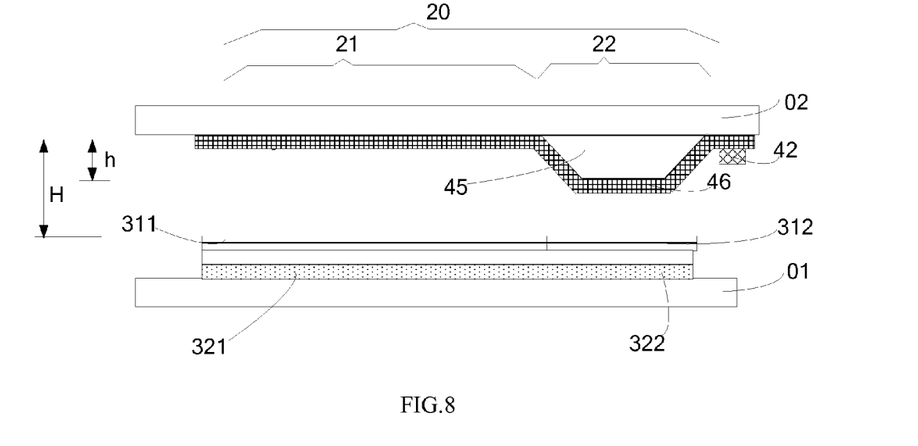
FIG. 8 is a cross-sectional structural view of the LCD panel of FIG. 6 along line C-C.

It is also possible that respective photoelectric curves of the two display area 21, 22 can be made identical by other approaches. Preferably, in the LCD panel of FIG. 5 or 6, the common electrode 311 of the transmissive display area 21 and the common electrode 312 of the reflective display area 22 are of the same shape; in such case, as shown in FIG. 7 (a partial sectional view along line B-B of FIG. 5) or FIG. 8 (a partial sectional view along line C-C of FIG. 6), an organic layer 45 is provided between the substrate 02 of the color filter substrate and the color filter layer 46 in the transmissive display area 22, the organic layer 45 acts to make the respective photoelectric curves of the transmissive display area 21 and the reflective display area 22 identical. The LCD panel of FIG. 7 or 8 mainly uses the thickness of the organic layer 45 to make the respective photoelectric curves of the reflective display area 22 and transmissive display area 21 identical. Preferably, as shown in FIG. 7 or 8, the thickness "h" of the organic layer of the reflective display area is half of thickness "H" of the liquid crystal layer of the transmissive display area. In the present embodiment of the disclosure, if the organic layer is only formed in the reflective display area on the color filter substrate, the thickness h of the organic layer 45 of the reflective display area is then the thickness of the organic layer that formed on the reflective display area. If, however, the organic layer is formed in both the reflective display area and the transmissive display area, strictly, the thickness h of the organic layer of the reflective display area then refers to the height difference between the respective thicknesses of the organic layers of the reflective display area and the transmissive display area. In addition, in examples, the "half" may not be precisely the half due to limits of fabrication processing.

It needs to be noted that, the voltage of the second conductive line 42 should be considered during mapping of the photoelectric curve of the reflective display area 22 of the LCD panel of FIG. 7, for example, the photoelectric curve of the reflective display area 22 may be mapped with the common voltage being applied as the voltage of the second conductive line 42. In the LCD panel of FIG. 8, the second conductive line 42 is formed on the color filter substrate on a position opposite to at least one data line, thus not affecting the photoelectric curve of the reflective display area 22; consequently, the voltage of the second conductive line 42 would not be considered during mapping of the photoelectric curve of the reflective display area 22.

Furthermore, as for AD-SDS LCD panels, the configuration of the pixel unit on the array substrate may be that as shown in FIG. 10, in which a reflective layer 51 is formed in the reflective display area 22 of the pixel unit and in the same layer as the gate line 11, with the reflective layer 51 being connected with the pixel electrode 321 of the transmissive display area 21 of the pixel unit through a via hole. Then, the reflective layer 51 of the reflective display area acts firstly to reflect lights as a reflective layer and secondly, as the pixel electrode 322 of the reflective display area 22, to generate an electric field in cooperation with the common electrode 312 for driving the liquid crystals in the reflective display area.

The configuration of the embedded touchscreen component in the LCD panel according to the present embodiment of the disclosure is described in more details below.

As shown in FIG. 2, i.e., the sectional view of the LCD panel along line A-A of FIGS. 5-8, the first conductive line 41 and the second conductive line 42 constitute a two-layer structure, and with a semiconductor layer 43 being provided between the first conductive line 42 and the second conductive line 43. The semiconductor layer 43 provided within the overlapping area of the two lines 41, 42 between the first conductive line 41 and the second conductive line 42 is a semiconductor layer made of noncrystalline silicon or polycrystalline silicon, for example.

For example, the overlapping area of the two lines 41, 42 on the color filter substrate may not be opposite to the overlapping area of the gate line 11 and data line 12 on the array substrate. Because the LCD panel according to the present embodiment of the disclosure requires the turn-on voltage of the gate line to drive the embedded touchscreen component, the data line 12 may affect the driving of the embedded touchscreen component by the gate line 11 in the case wherein the overlapping area of the two lines 41, 42 is opposite to the overlapping area of the gate line 11 and the data line 12. Thus it is preferable to choose this solution of being not opposite in the design process.

Preferably, a support 44 within the overlapping area of the two lines 41, 42 is provided between the embedded touchscreen component and the color filter substrate. Preferably, the support 44 is made of the same resin material as that of the spacers between the array substrate and the color filter substrate of the LCD panel, and the sensitivity of the embedded touchscreen component may be improved by adopting such material because of the good resilience of the resin materials. It is also possible to choose other materials for preparing the support 44; for example, the support 44 may be made of a transparent organic material, which may improve the light transmittance of the embedded touchscreen component. The purpose for providing the support 44 is to enable the embedded touchscreen component to be driven by the turn-on voltage of the gate line sensitively even in the case of a relatively small touching force, thereby sensitively locating or positioning the touched position based on the signal variation on the first and the second conductive line.

It needs to be noted that for the purpose of illustration, the portions not directly related to the embodiments of the present disclosure are simplified or ignored in the description of the embodiments and the accompanied drawings, because the portions can be well-known or obtained by those skilled in the art without creative works.

The above mentioned solutions are described by referring to AD-SDS LCD panels, however, the scope and spirit of the disclosed technology are not intended to be limited to AD-SDS type LCD panels; any other LCD panel, such as transflective LCD panels, may be applied to the solutions provided by the embodiments of the present disclosure for improving the poor display result of the transmissive display area of the LCD panel during the process to combine with the embedded touchscreen components. As for LCD panels of different types, the above mentioned solutions are explained in further details below in conjunction with the structures of those LCD panels.

For example, for IPS or TN type LCD panels, despite of the different pixel configuration, the configuration to combine the embedded touchscreen component with any transflective LCD panel may refer to the above mentioned solution described in conjunction with the AD-SDS LCD panel.

Furthermore, in the AD-SDS LCD panels, there is one LCD panel with a reverses configuration of pixel unit as compared to that shown in FIG. 3-FIG. 6; in such LCD panel, the common electrode is formed on the array substrate prior to the pixel electrode, with the pixel electrode connected with the drain electrode of the thin-film transistor. For such LCD panels, preferably, the pixel electrode of the reflective display area of the pixel unit and the pixel electrode of the transmissive display area of the pixel unit are of different shapes, such that the respective photoelectric curves of the transmissive display area and the reflective display area can become identical. In the present embodiment of the disclosure, the shape of the pixel electrode of the reflective display area of the pixel unit is different from that of the pixel electrode of the transmissive display area; for example, the pixel electrode of the transmissive display area is in the shape of a bar (a long rectangle or strip), whereas the pixel electrode of the reflective display area is in the shape of another bar not in parallel with that of the pixel electrode of the transmissive display area. The angle between the two bar-shaped electrodes is not definitely predetermined as long as the photoelectric curves of the two display areas are identical. Preferably, the bar-shaped pixel electrode of the transmissive display area forms an angle of 45 degree with the bar-shaped pixel electrode of the reflective display area, such that the optical paths of the reflective display area and the transmissive display area of the LCD panel are substantially identical, and the angle may be further adjusted to make the photoelectric curves of the two display areas identical.

The remaining parts may refer to the technical solution described above in conjunction with the AD-SDS LCD panel.

The embedded touchscreen function of the transflective LCD panel is enabled by the LCD panel according to the present embodiment of the disclosure.

An embodiment of the disclosure also discloses a driving method for any of the LCD panels of the embodiment described above, comprising:

Step 101 of applying a first voltage to the first conductive line of the embedded touchscreen component, applying a second voltage to the second conductive line of the embedded touch screen component in the LCD panel, wherein the first voltage is not equal to the second voltage;

wherein the on-state current between the first conductive line 41 and the second conductive line 42 is less than the threshold current of the data processing unit in the case of no touching;

Preferably, the second voltage is larger than zero, and no more than the common voltage. The first voltage may be larger than the second voltage, or less than the second voltage. By way of example, the case where the first voltage is less than the second voltage may give rise to a better result. In practice, a proper voltage difference between the first conductive line and the second conductive line may be chosen as desired.

Step 102 of the on-state current of the semiconductor layer 43 at the touched position becoming no less than the threshold current of the data processing unit due to the gate line 11 turn-on voltage in the case of touching, the first conductive line 41 and the second conductive line 42 transmit the current signal of the semiconductor layer 43 to the data processing unit, in order to localize or position the touched position.

In the case of touching, the semiconductor layer 43 of the embedded touchscreen component at the touched position is forced to approach the gate line 11 on the array substrate, such that the turn-on voltage of the gate line 11 amplifies the on-state current of the semiconductor layer 43 at the touched position, then the first conductive line 41 and the second conductive line 42 transmit the current signal of the semiconductor layer 43 to the data processing unit, the data processing unit then compares the on-state current to its threshold current, and if the former one is no less than the latter one, the data processing unit then localizes the touched position based on the signal variations on the first conductive line 41 and the second conductive line 42.

Those described above belong to embodiments of the present disclosure, yet not intend to limit the protection scope thereof in any way; those skilled in the art shall recognize that various variations and permutations of the embodiments still fall into the protection scope of the present disclosure. The protection scope of the present disclosure shall be determined as set forth in the appended claims.

What is claimed is:
1. A liquid crystal display (LCD) panel, comprising:
an array substrate;
a color filter substrate; and
a layer of liquid crystal provided between the two substrates,
wherein gate lines and data lines are formed on the array substrate to define pixel units, an embedded touchscreen component is provided on the inner side of the color filter substrate, comprising:

a first conductive line and a second conductive line, and a semiconductor layer provided between the first conductive line and the second conductive line within an overlapping area of the two lines;

the overlapping area of the first conductive line and the second conductive line on the color filter substrate is not opposite to the overlapping area of the gate line and the data line on the array substrate; and the first conductive line and the second conductive line constitute a two-layer structure, a width of the first conductive line is smaller in a direction perpendicular to the gate lines than a width, of the semiconductor layer in the direction perpendicular to the gate lines, and the semiconductor layer is positioned essentially opposite to one of the gate lines.

2. The LCD panel according to claim 1, wherein the first conductive line is formed on the color filter substrate, opposite to at least one gate line on the array substrate; and the second conductive line is formed on the color filter substrate, opposite to at least one data line on the array substrate.

3. The LCD panel according to claim 1, wherein each of the pixel units comprises a transmissive display area and a reflective display area;

wherein the first conductive line is formed on the color filter substrate, opposite to at least one gate line on the array substrate;

the second conductive line is formed on the color filter substrate, opposite to the reflective display areas of at least one column of pixel units on the array substrate or at least one data line on the array substrate.

4. The LCD panel according to claim 3, wherein the reflective display area of the pixel unit is provided with a reflective layer, and the reflective layer is in a same layer as the gate line or the data line.

5. The LCD panel according to claim 3, wherein an organic layer is provided between a base substrate and a color filter layer of the color filter substrate, and the organic layer acts to make the photoelectric curve of the reflective display area identical with that of the transmissive display area.

6. The LCD panel according to claim 5, wherein the thickness of the organic layer of the reflective display area is a half of the thickness of the liquid crystal layer of the transmissive display area.

7. The LCD panel according to claim 3, wherein the reflective display area of the pixel unit is provided with a reflective layer, and the reflective layer is in a same layer as the gate line and connected with the pixel electrode of the transmissive display area of the pixel unit through a via hole.

8. The LCD panel according to claim 3, wherein the common electrode of the reflective display area of the pixel unit and the common electrode of the transmissive display area of the pixel unit are of different shapes, such that the respective photoelectric curves of the transmissive display area and the reflective display area of the pixel unit are identical.

9. The LCD panel according to claim 8, wherein the common electrode of the transmissive display area is in the shape of a bar, and the common electrode of the reflective display area is in the shape of another bar not in parallel with that of the common electrode of the transmissive display area.

10. The LCD panel according to claim 9, wherein the bar-shaped common electrode of the transmissive display area forms an angle of 45 degree with the bar-shaped common electrode of the reflective display area.

11. The LCD panel according to claim 3, wherein the pixel electrode of the reflective display area of the pixel unit and the pixel electrode of the transmissive display area of the pixel unit are of different shapes, such that the respective photoelectric curves of the transmissive display area and the reflective display area of the pixel unit are identical.

12. The LCD panel according to claim 11, wherein the pixel electrode of the transmissive display area is in the shape of a bar, and the pixel electrode of the reflective display area is in the shape of another bar not in parallel with that of the pixel electrode of the transmissive display area.

13. The LCD panel according to claim 12, wherein the bar-shaped pixel electrode of the transmissive display area forms an angle of 45 degree with the bar-shaped pixel electrode of the reflective display area.

14. The LCD panel according to claim 1, wherein the semiconductor layer provided between the first conductive line and the second conductive line within an overlapping area of the two conductive lines is made of noncrystalline silicon or polycrystalline silicon.

15. The LCD panel according to claim 1, wherein a support within the overlapping area of the two lines is provided between the color filter substrate and the embedded touchscreen component.

16. A driving method of a LCD panel, the LCD panel comprising an array substrate, a color filter substrate, and a layer of liquid crystal provided between the two substrates, wherein gate lines and data lines are formed on the array substrate to define pixel units, an embedded touchscreen component is provided on the inner side of the color filter substrate and comprises: a first conductive line and a second conductive line and a semiconductor layer provided between the first conductive line and the second conductive line within an overlapping area of the two lines; the overlapping area of the first conductive line and the second conductive line on the color filter substrate is not opposite to the overlapping area of the gate line and the data line on the array substrate; and the first conductive line and the second conductive line constitute a two-layer structure, a width of the first conductive line is smaller in a direction perpendicular to the gate lines than a width of the semiconductor layer in the direction perpendicular to the gate lines, and the semiconductor layer is positioned essentially opposite to one of the gate lines, the driving method comprising:

applying a first voltage to the first conductive line of the embedded touchscreen component, and applying a second voltage to the second conductive line of the embedded touchscreen component in the LCD panel, wherein the first voltage is not equal to the second voltage;

the on-state current of the semiconductor layer between the first conductive line and the second conductive line is less than the threshold current of a data processing unit in the case of no touching;

the on-state current of the semiconductor layer at a touched position becomes no less than the threshold current of the data processing unit due to the gate turn-on voltage in the case of touching, the first conductive line and the second conductive line transmit the current signal of the semiconductor layer to the data processing unit for localizing the touched position.

17. The driving method of the LCD panel according to claim 16, wherein the second voltage is larger than 0, and no more than the common voltage.

* * * * *